US012597440B2

(12) United States Patent
Iwashiro

(10) Patent No.: US 12,597,440 B2
(45) Date of Patent: Apr. 7, 2026

(54) MAGNETIC DISK DEVICE

(71) Applicants:Kabushiki Kaisha Toshiba, Tokyo (JP); Toshiba Electronic Devices & Storage Corporation, Tokyo (JP)

(72) Inventor: Masafumi Iwashiro, Yokohama Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/884,444

(22) Filed: Sep. 13, 2024

(65) Prior Publication Data

US 2025/0273237 A1     Aug. 28, 2025

(30) Foreign Application Priority Data

Feb. 26, 2024     (JP) ................................. 2024-026623

(51) Int. Cl.
G11B 5/55 (2006.01)
G11B 27/36 (2006.01)

(52) U.S. Cl.
CPC ............ G11B 5/5547 (2013.01); G11B 27/36 (2013.01)

(58) Field of Classification Search
None
See application file for complete search history.

(56) References Cited

U.S. PATENT DOCUMENTS

| | | | | |
|---|---|---|---|---|
| 5,461,521 | A | * | 10/1995 | Ito .......................... G11B 19/04 |
| | | | | 360/75 |
| 5,831,787 | A | * | 11/1998 | Yoshida ............... G11B 5/5547 |
| | | | | 360/78.09 |
| 6,781,787 | B1 | | 8/2004 | Codilian et al. |
| 7,050,258 | B1 | * | 5/2006 | Codilian ................ G11B 19/28 |
| | | | | 360/73.03 |
| 7,522,368 | B2 | | 4/2009 | Xia et al. |
| 7,710,678 | B2 | | 5/2010 | Kokami et al. |
| 7,995,305 | B1 | * | 8/2011 | Ton-That ............. G11B 5/5534 |
| | | | | 360/75 |
| 9,401,168 | B1 | * | 7/2016 | Ito .................... G11B 20/10037 |
| 9,947,352 | B1 | | 4/2018 | Sudo et al. |
| 10,008,227 | B1 | | 6/2018 | Sudo et al. |
| 10,109,308 | B1 | | 10/2018 | Johnson et al. |
| 2003/0048571 | A1 | * | 3/2003 | Soyama ............... G11B 5/5547 |
| | | | | 360/78.04 |
| 2007/0247740 | A1 | * | 10/2007 | Wasa ..................... G11B 21/12 |
| 2010/0309575 | A1 | * | 12/2010 | Jun .................... G11B 19/2054 |
| | | | | 360/71 |
| 2023/0061685 | A1 | * | 3/2023 | Weerasooriya ...... G11B 15/473 |

FOREIGN PATENT DOCUMENTS

JP     04341979 A  *  11/1992

OTHER PUBLICATIONS

Machine Translation of JP 04-341979 (Year: 1992).*

* cited by examiner

*Primary Examiner* — Peter Vincent Agustin

(74) *Attorney, Agent, or Firm* — Kim & Stewart LLP

(57) ABSTRACT

According to an embodiment, in a magnetic disk device, a current detection circuit detects an amount of a first current that is generated by a drive circuit and drives a motor. In a seek operation, a controller acquires a commanded value based on a deviation amount of the amount of the first current detected by the current detection circuit from the commanded value. Then, the controller inputs the acquired commanded value to the drive circuit.

16 Claims, 7 Drawing Sheets

FIG.3

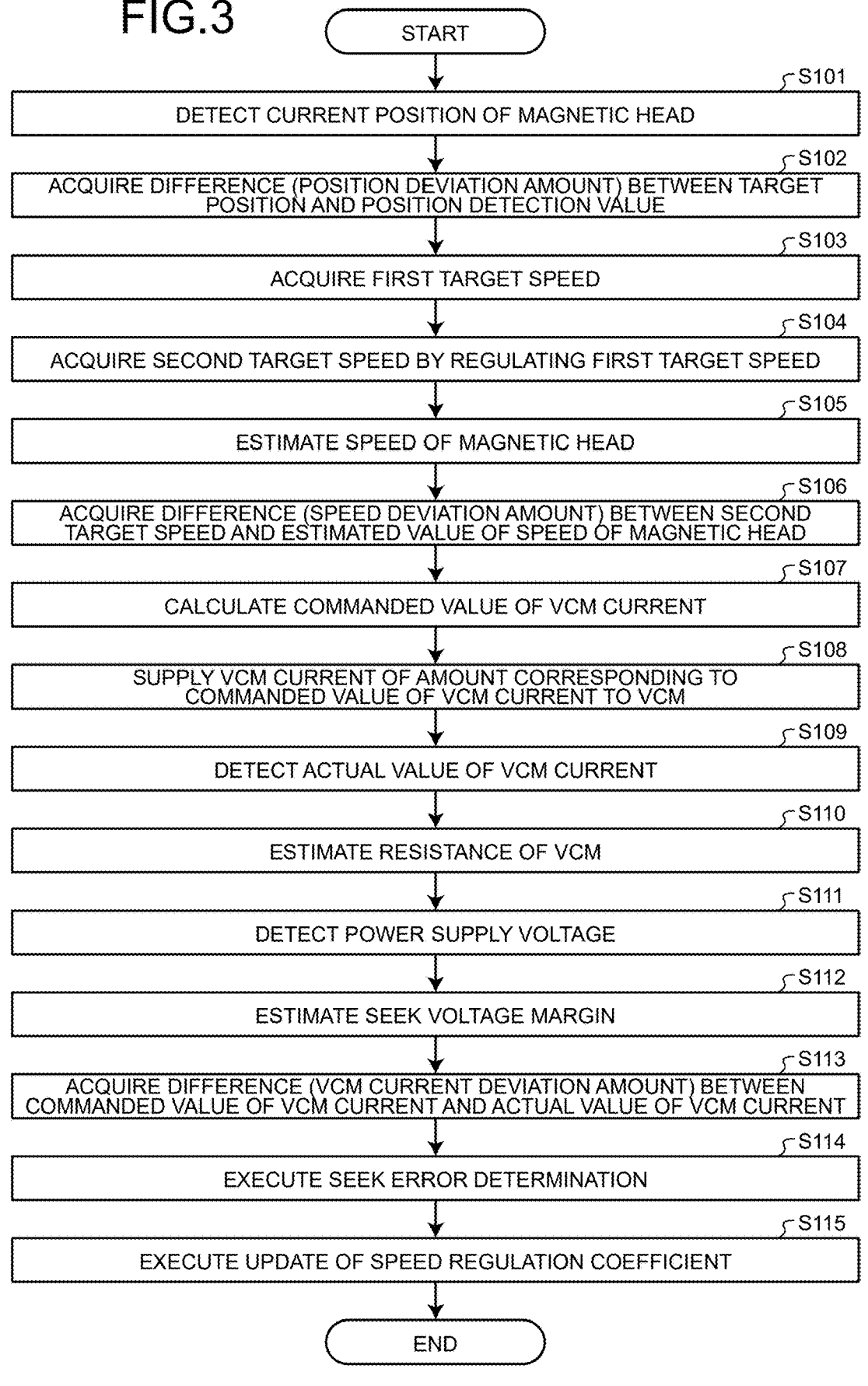

START

S101
DETECT CURRENT POSITION OF MAGNETIC HEAD

S102
ACQUIRE DIFFERENCE (POSITION DEVIATION AMOUNT) BETWEEN TARGET POSITION AND POSITION DETECTION VALUE

S103
ACQUIRE FIRST TARGET SPEED

S104
ACQUIRE SECOND TARGET SPEED BY REGULATING FIRST TARGET SPEED

S105
ESTIMATE SPEED OF MAGNETIC HEAD

S106
ACQUIRE DIFFERENCE (SPEED DEVIATION AMOUNT) BETWEEN SECOND TARGET SPEED AND ESTIMATED VALUE OF SPEED OF MAGNETIC HEAD

S107
CALCULATE COMMANDED VALUE OF VCM CURRENT

S108
SUPPLY VCM CURRENT OF AMOUNT CORRESPONDING TO COMMANDED VALUE OF VCM CURRENT TO VCM

S109
DETECT ACTUAL VALUE OF VCM CURRENT

S110
ESTIMATE RESISTANCE OF VCM

S111
DETECT POWER SUPPLY VOLTAGE

S112
ESTIMATE SEEK VOLTAGE MARGIN

S113
ACQUIRE DIFFERENCE (VCM CURRENT DEVIATION AMOUNT) BETWEEN COMMANDED VALUE OF VCM CURRENT AND ACTUAL VALUE OF VCM CURRENT

S114
EXECUTE SEEK ERROR DETERMINATION

S115
EXECUTE UPDATE OF SPEED REGULATION COEFFICIENT

END

MAGNETIC DISK DEVICE

CROSS-REFERENCE TO RELATED APPLICATIONS

This application is based upon and claims the benefit of priority from Japanese Patent Application No. 2024-026623, filed on Feb. 26, 2024; the entire contents of which are incorporated herein by reference.

FIELD

Embodiments described herein relate generally to a magnetic disk device.

BACKGROUND

In a magnetic disk device, a magnetic head is moved in a radial direction of a magnetic disk by a voice coil motor (VCM). In a seek operation, as an amount of current supplied to the VCM increases, a moving speed of the magnetic head increases, and time required for the seek operation is shortened. That is, performance is improved.

However, when a margin of a voltage drop amount to the power supply voltage in the VCM due to supply of current to the VCM is insufficient, an intended amount of current cannot be applied to the VCM, and as a result, the seek operation may fail. That is, the performance may deteriorate by contrast.

BRIEF DESCRIPTION OF THE DRAWINGS

FIG. 3 is a flowchart for describing the seek operation of the magnetic disk device according to the embodiment;

DETAILED DESCRIPTION

In general, according to one embodiment, a magnetic disk device includes a magnetic disk, an arm, a motor, a drive circuit, a current detection circuit, and a controller. The arm is provided with a magnetic head configured to access the magnetic disk. The motor is configured to move the arm to move the magnetic head in a radial direction of the magnetic disk. The drive circuit is configured to generate a first current that drives the motor according to a commanded value, and supply the generated first current to the motor. The current detection circuit is configured to detect an amount of the first current generated by the drive circuit. In a seek operation, the controller is configured to acquire the commanded value for bringing a position of the magnetic head in the radial direction closer to a target position based on a deviation amount of the amount of the first current detected by the current detection circuit from the commanded value. Then, the controller is configured to input the acquired commanded value to the drive circuit.

Exemplary embodiments of a magnetic disk device will be explained below in detail with reference to the accompanying drawings. The present invention is not limited to the following embodiment.

EMBODIMENT

Figure 1:
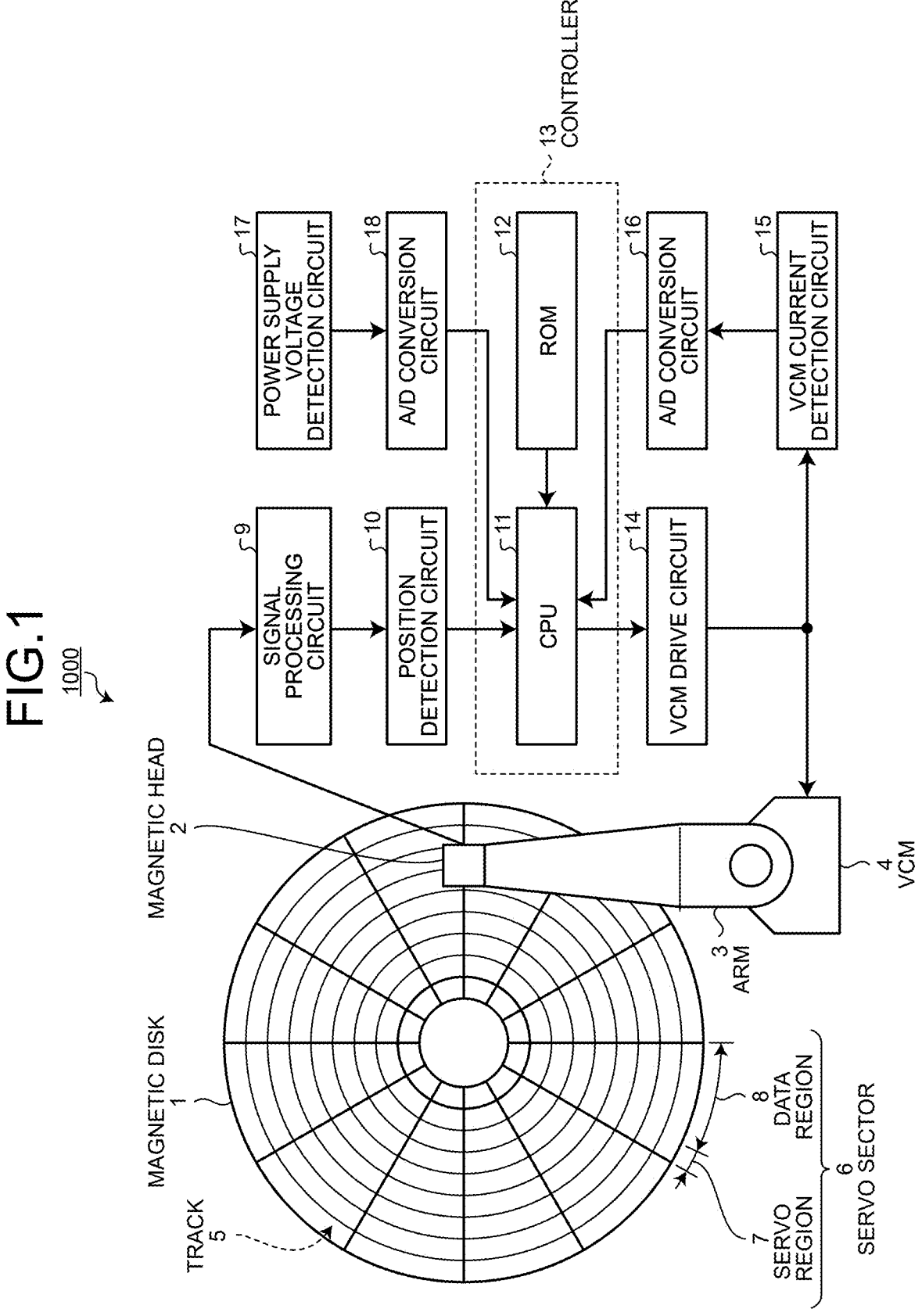
FIG. 1 is a view illustrating an example of a hardware configuration of a magnetic disk device according to an embodiment.

FIG. 1 is a view illustrating an example of a hardware configuration of a magnetic disk device 1000 according to the embodiment.

The magnetic disk device 1000 is connected to a host (not illustrated). The magnetic disk device 1000 can receive an access command from a host. The access command includes a write command and a read command.

The magnetic disk device 1000 includes a magnetic disk 1 on a surface of which a magnetic layer is formed. The magnetic disk device 1000 accesses the magnetic disk 1 in response to the access command. The access includes writing of data and reading of data.

The magnetic disk 1 is rotated at a predetermined angular velocity by a spindle motor (not illustrated). The magnetic head 2 accesses the magnetic disk 1 by a write head and a read head provided therein.

Note that one magnetic disk 1 is illustrated in FIG. 1. However, the magnetic disk device 1000 may include a plurality of the magnetic disks 1. In a case where the magnetic disk device 1000 includes the plurality of magnetic disks 1, the plurality of magnetic disks 1 is integrally rotated by the spindle motor. Furthermore, a magnetic head 2 is provided for each recording surface of the plurality of magnetic disks 1.

In addition to the magnetic disk 1 and the magnetic head 2, the magnetic disk device 1000 includes an arm 3, a VCM 4, a signal processing circuit 9, a position detection circuit 10, a controller 13, a VCM drive circuit 14, a VCM current detection circuit 15, an analog-to-digital (A/D) conversion circuit 16, a power supply voltage detection circuit 17, and an A/D conversion circuit 18.

The magnetic head 2 is provided at a leading end of the arm 3. When the arm 3 is moved by the VCM 4, the magnetic head 2 is moved in a radial direction of the magnetic disk 1.

In the magnetic layer formed on the surface of the magnetic disk 1, servo information is written by, for example, a servo writer or the like. The servo information may be written to the magnetic disk 1 by self-servo write (SSW). The servo information is information used to acquire a current position of the magnetic head 2. The servo information may include sector/cylinder information, burst patterns, and post codes.

Servo regions 7 arranged radially are illustrated in FIG. 1 as an example of arrangement of servo regions in which servo information is written. A data region 8 in which data (such as data received from a host) can be written is provided between the servo regions 7. One servo region 7 and a data region 8 through which the magnetic head 2 passes immediately after the servo region 7 are included in a servo sector 6.

When the magnetic head 2 passes through the servo region 7, the servo information is read from the servo region 7, and a current position of the magnetic head 2 is detected on the basis of the read servo information. Since the magnetic disk 1 is rotated at a constant angular velocity, the magnetic head 2 passes through the servo regions 7 at constant time intervals. Thus, the current position of the magnetic head 2 is detected at the constant time intervals.

In the radial direction of the magnetic disk 1, a plurality of concentric tracks 5 is provided at a predetermined pitch. In each of the data regions 8, a large number of sectors are formed along each of the tracks 5. Data is written and read by the magnetic head 2 for each sector.

The signal processing circuit 9 demodulates a signal read by the magnetic head 2. The signal processing circuit 9 can also execute error correction at the time of demodulating the signal.

The position detection circuit 10 separates data and position information (that is, a result of demodulation of the servo information) from the signal demodulated by the signal processing circuit 9. The position detection circuit 10 detects the current position of the magnetic head 2 from the position information. The current position of the magnetic head 2 which position is detected by the position detection circuit 10 is referred to as a position detection value.

The controller 13 executes overall control of the magnetic disk device 1000 including positioning control of the magnetic head 2. The controller 13 includes a central processing unit (CPU) 11 that is a processor capable of executing a computer program, and a read only memory (ROM) 12 that is a nonvolatile storage device. The ROM 12 stores a firmware program. The CPU 11 executes the control of the magnetic disk device 1000 on the basis of the firmware program stored in the ROM 12.

The positioning control includes control of a seek operation and control of a tracking operation. The seek operation is an operation of moving the magnetic head 2 in the radial direction toward a target track 5. The tracking operation is an operation of maintaining the magnetic head 2 on the target track 5.

In the positioning control, the controller 13 (more precisely, the CPU 11) calculates a commanded value of an amount of current that drives the VCM 4 on the basis of the position detection value acquired by the position detection circuit 10 in such a manner that the position of the magnetic head 2 in the radial direction approaches a target position. Hereinafter, the current for driving the VCM 4 is referred to as a VCM current. The commanded value of the amount of the VCM current is referred to as a commanded value of the VCM current.

The VCM drive circuit 14 generates the VCM current of an amount according to the commanded value of the VCM current, and supplies the generated VCM current to the VCM 4.

The VCM current detection circuit 15 detects the amount of the VCM current generated by the VCM drive circuit 14 and supplied to the VCM 4. The amount of the VCM current detected by the VCM current detection circuit 15 is converted into a digital value by an A/D conversion circuit 16 and input to the CPU 11. Hereinafter, the amount of the VCM current detected by the VCM current detection circuit 15 and converted into the digital value by the A/D conversion circuit 16 is referred to as an actual value of VCM current.

The power supply voltage detection circuit 17 is a circuit that detects a power supply voltage, that is, voltage of power supplied from the outside to the magnetic disk device 1000. A voltage value detected by the power supply voltage detection circuit 17 is converted into a digital value by the A/D conversion circuit 18, and the voltage value converted into the digital value is input to the CPU 11. Hereinafter, the voltage value detected by the power supply voltage detection circuit 17 and converted into the digital value by the A/D conversion circuit 18 is referred to as a power supply voltage value.

Note that the position detection value is acquired from each of the servo regions 7 in synchronization with a rotation angle of the magnetic disk 1. The controller 13 is included in a sample value control system that determines an input to a control target (such as the VCM 4) at constant time intervals. With respect to the VCM 4, multi-rate control in which driving is performed in a 1/N cycle (N is an integer of 2 or more) of an acquisition cycle of the position detection value may be performed. However, acquisition timing of the actual value of the VCM current and a power supply voltage detection value is the same as the acquisition timing of the position detection value.

In the seek operation, a speed of the magnetic head 2 (more precisely, a moving speed of the magnetic head 2 in the radial direction) increases as the amount of the VCM current increases, whereby performance is improved. However, a voltage drop amount (hereinafter, referred to as a seek voltage) in the VCM 4 increases depending on the amount of the VCM current and the like. When a margin of the seek voltage to the power supply voltage (hereafter, seek voltage margin) is insufficient, an intended amount of current cannot flow in the VCM 4 specifically at the time of deceleration of the magnetic head 2, and there is a possibility that the seek operation fails and the performance deteriorates. Thus, it is desirable that the seek voltage margin is maintained small to the extent of not becoming insufficient.

Thus, the CPU 11 estimates the seek voltage margin and controls the amount of the VCM current in such a manner that the estimated value of the seek voltage margin is maintained within a predetermined range.

An instantaneous value of the seek voltage margin acquired by the estimation does not have sufficient accuracy and has a large variation. Thus, the CPU 11 acquires the seek voltage margin used to control the amount of the VCM current by averaging the seek voltage margin acquired by a large number of the seek operations.

However, in the control using only the average value of the seek voltage margins by the large number of the seek operations, it is not possible to cope with a change in the instantaneous value of the actual seek voltage margin. Then, there is a possibility that the actual seek voltage margin temporarily becomes insufficient and a frequency of failure of the seek operation is increased.

Thus, in the embodiment, the CPU 11 controls the VCM current in the seek operation by using not only the estimated value of the seek voltage margin but also a difference acquired by subtraction of the actual value of the VCM current from the commanded value of the VCM current (hereinafter, referred to as a VCM current deviation amount). When the seek voltage margin is insufficient, the VCM current deviation amount increases. Since the actual value of the VCM current can be accurately acquired in real time, the CPU 11 can accurately detect a sign of insufficiency of the seek voltage margin or the insufficiency of the seek voltage margin in real time.

By using the VCM current deviation amount, the CPU 11 can finely control the amount of the VCM current in such a manner as not to cause the sign of insufficiency of the seek voltage margin or the insufficiency of the seek voltage margin. As a result, the actual seek voltage margin can be maintained at a small level to the extent of not becoming insufficient, and the performance can be improved as compared with a case where only the average value of the seek voltage margins is used.

Figure 2:
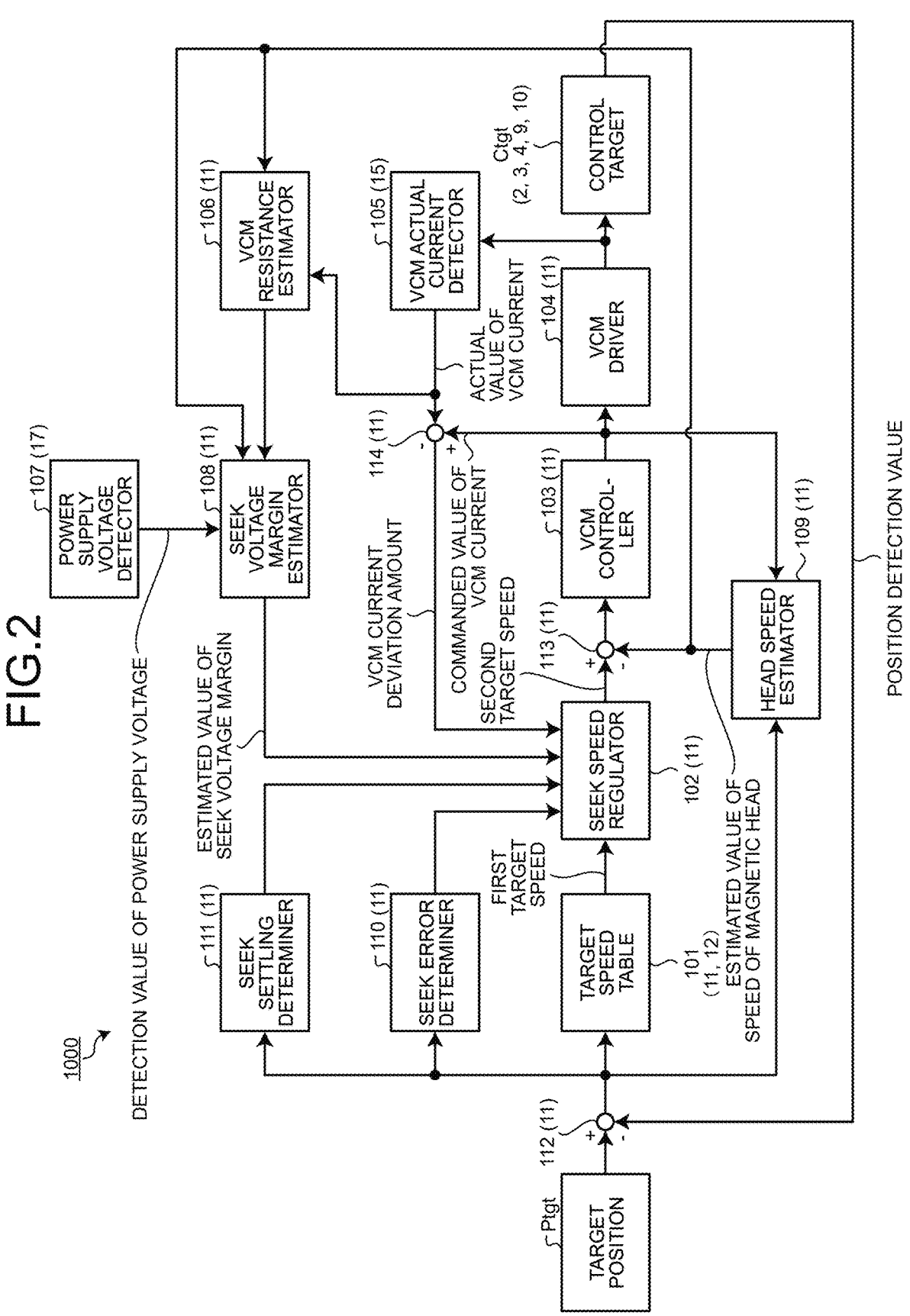
FIG. 2 is a view illustrating an example of a control block for a seek operation which control block is included in the magnetic disk device according to the embodiment.

FIG. 2 is a view illustrating an example of a control block for the seek operation which control block is included in the magnetic disk device 1000 according to the embodiment.

The magnetic disk device 1000 includes a target speed table 101, a seek speed regulator 102, a VCM controller 103, a VCM driver 104, a VCM actual current detector 105, a VCM resistance estimator 106, a power supply voltage detector 107, a seek voltage margin estimator 108, a head speed estimator 109, a seek error determiner 110, a seek settling determiner 111, and three subtractors 112 to 114.

The target speed table 101 is stored in, for example, the ROM 12 and read by the CPU 11. The seek speed regulator 102, the VCM controller 103, the VCM resistance estimator 106, the seek voltage margin estimator 108, the head speed estimator 109, the seek error determiner 110, the seek settling determiner 111, and the three subtractors 112 to 114 are realized by the CPU 11. The VCM driver 104 corresponds to the VCM drive circuit 14. The VCM actual current detector 105 corresponds to the VCM current detection circuit 15 and the A/D conversion circuit 16. The power supply voltage detector 107 corresponds to the power supply voltage detection circuit 17 and the A/D conversion circuit 18.

The magnetic disk device 1000 controls a control target Ctgt by these functional components. The control target Ctgt includes the VCM 4, the arm 3, the magnetic head 2, the signal processing circuit 9, and the position detection circuit 10. As a result of the control of the control target Ctgt, a position detection value that is a detection value of the current position of the magnetic head 2 in the radial direction is output by the position detection circuit 10.

By predetermined calculation, the CPU 11 acquires a target position Ptgt that is a target position in the radial direction. The subtractor 112 calculates a difference between the target position Ptgt in the radial direction and the position detection value by subtracting the position detection value from the target position Ptgt. The difference between the target position Ptgt in the radial direction and the position detection value is referred to as a position deviation amount.

The CPU 11 acquires a first target speed on the basis of the position deviation amount and the target speed table 101.

The target speed table 101 is information that defines a relationship between a seek distance and a target speed in the radial direction of the magnetic head 2. The seek distance is a distance in the radial direction from the current position of the magnetic head 2 to a target track. According to the target speed table 101, for example, the relationship between the seek distance and the target speed of the magnetic head 2 is defined in such a manner that the target speed of the magnetic head 2 becomes faster as the seek distance is longer. The CPU 11 searches the target speed table 101 by using the position deviation amount as the seek distance and acquires, as the first target speed, the target speed of the magnetic head 2 which target speed corresponds to the position deviation amount.

Note that the target speed table 101 may be information in a table format or may be configured as a mathematical expression.

The speed of the magnetic head 2 and the velocity of the VCM 4 can be easily and mutually converted. Thus, the target speed may be expressed as a speed of the VCM 4. Hereinafter, the speed (including the target speed and the like) will be described as representing the speed of the magnetic head 2 unless otherwise specified.

The seek speed regulator 102 acquires a second target speed by performing calculation using the first target speed and a parameter value. More specifically, the seek speed regulator 102 acquires the second target speed by multiplying the first target speed by a coefficient managed as the parameter value. The coefficient is referred to as a speed regulation coefficient.

In addition, on the basis of at least the VCM current deviation amount, the seek speed regulator 102 updates the speed regulation coefficient that is the parameter value. Here, as an example, the seek speed regulator 102 updates the speed regulation coefficient on the basis of the estimated value of the seek voltage margin, a seek settling evaluation value, whether a seek error is generated, and the VCM current deviation amount. As the speed regulation coefficient is changed by the update, a direction and amount of change from the first target speed to the second target speed are regulated. For example, in a case where the speed regulation coefficient is larger than 1, the second target speed is made higher than the first target speed. In a case where the speed regulation coefficient is smaller than 1, the second target speed is made lower than the first target speed.

The seek error is a failure of the seek operation. The seek error determiner 110 determines whether the seek error is generated. The seek error determiner 110 determines whether the seek operation is failed on the basis of time required for the seek operation, the position deviation amount, an overshoot amount by which the magnetic head 2 has passed the target position Ptgt, and the like.

Note that a seek settling operation is executed at the end of the seek operation. The seek settling operation is an operation of determining whether an access to the magnetic disk 1 can be started on the basis of the position deviation amount. In one example, in the seek settling operation, it is determined whether the positional deviation amount has continued to be in a set range for a predetermined time. When it is confirmed that the positional deviation amount has continued to be in the set range for the predetermined time, the seek settling operation (and the seek operation) is completed.

Hereinafter, the position deviation amount during the seek settling operation and in the seek settling operation may be referred to as a position error.

The seek settling determiner 111 acquires the seek settling evaluation value. The seek settling evaluation value is, for example, a maximum value of an absolute value of the position error in a set period (such as a period of the predetermined number of times of sampling) immediately after completion of the seek settling operation (in other words, the seek operation). Even when the seek settling operation is completed, in a case where the speed of the magnetic head 2 in the seek operation is too high, the position error may increase after the seek settling operation. It is not preferable from a viewpoint of accuracy of the subsequent positioning control (such as the tracking operation) that the position error is large after the seek settling operation. Thus, the seek settling determiner 111 acquires a seek settling evaluation value in such a manner that the position error can be evaluated after the seek settling operation. The seek speed regulator 102 uses the seek settling evaluation value for updating the speed regulation coefficient and controls an adverse effect appearing in the position error after the seek settling operation due to the second target speed.

The head speed estimator 109 estimates the speed of the magnetic head 2 on the basis of the position deviation amount and the commanded value of the VCM current.

The subtractor 113 acquires a speed deviation amount by calculation of subtracting the estimated value of the speed of the magnetic head 2 which value is acquired by the head speed estimator 109 from the second target speed.

The VCM controller 103 calculates the commanded value of the VCM current on the basis of the speed deviation amount. The VCM controller 103 calculates the commanded value of the VCM current in such a manner that the speed deviation amount decreases, in other words, the speed of the magnetic head 2 in the radial direction approaches the second target speed. In one example, the VCM controller 103 calculates the commanded value of the VCM current in such a manner that the commanded value of the VCM current becomes larger as the absolute value of the speed deviation amount becomes larger.

The VCM driver 104 generates the VCM current of an amount according to the commanded value of the VCM current. The VCM current generated by the VCM driver 104 is supplied to the VCM 4 in the control target Ctgt.

The VCM actual current detector 105 detects the amount of the VCM current generated by the VCM driver 104 and supplied to the VCM 4. That is, the VCM actual current detector 105 acquires the actual value of the VCM current by the detection.

The subtractor 114 acquires the VCM current deviation amount by calculation of subtracting the actual value of the VCM current from the commanded value of the VCM current. The VCM current deviation amount is input to the seek speed regulator 102.

The VCM resistance estimator 106 estimates resistance of the VCM 4 on the basis of the estimated value of the speed of the magnetic head 2 which value is acquired by the head speed estimator 109 and the actual value of the VCM current. The VCM resistance estimator 106 uses a table or a function to acquire an estimated value of the resistance of the VCM 4 from the estimated value of the speed of the magnetic head 2 which value is estimated by the head speed estimator 109 and the actual value of the VCM current.

The power supply voltage detector 107 detects a power supply voltage.

The seek voltage margin estimator 108 estimates the seek voltage margin on the basis of the power supply voltage value detected by the power supply voltage detector 107, the estimated value of the speed of the magnetic head 2 which value is acquired by the head speed estimator 109, and the estimated value of the resistance of the VCM 4 which value is acquired by the VCM resistance estimator 106. The seek voltage margin estimator 108 estimates the seek voltage margin by, for example, calculation of the following expression (1).

$$V_m = V_{in} - (R_{VCM} * I_{VCM} + K * v_h) \tag{1}$$

In the expression (1), $V_m$ is the seek voltage margin. Vin is the power supply voltage, $R_{VCM}$ is the resistance of the VCM 4, and $I_{VCM}$ is the current supplied to the VCM 4. $V_h$ is the speed of the magnetic head 2. K is a constant that is multiplied by the speed of the magnetic head 2 to obtain a reverse voltage.

Note that $(R_{VCM}*I_{VCM}+K*V_h)$ included on the right side of the expression (1) corresponds to the seek voltage, that is, the voltage drop amount in the VCM 4.

The estimated value of the seek voltage margin which value is acquired by the seek voltage margin estimator 108 is input to the seek speed regulator 102.

Next, the operation of the magnetic disk device 1000 according to the embodiment will be described.

FIG. 3 is a flowchart for describing the seek operation of the magnetic disk device 1000 according to the embodiment. In the drawing, the operation executed when the magnetic head 2 passes through one of the servo regions 7 during the seek operation will be described. That is, the series of operations illustrated in the drawing is repeatedly executed during the seek operation.

When the magnetic head 2 passes through the servo region 7, the magnetic disk device 1000 detects the current position of the magnetic head 2 on the basis of the servo information read by the magnetic head 2 (S101).

Specifically, the servo information read by the magnetic head 2 is demodulated by the signal processing circuit 9. The position detection circuit 10 acquires the position detection value on the basis of the demodulated servo information.

The subtractor 112 acquires the position deviation amount that is the difference between the target position Ptgt and the position detection value by calculation of subtracting the position detection value from the target position Ptgt (S102).

The CPU 11 refers to the target speed table 101 and acquires the target speed corresponding to the position deviation amount as the first target speed (S103).

The seek speed regulator 102 acquires the second target speed by regulating the first target speed (S104). In this example, the seek speed regulator 102 acquires the second target speed by multiplying the first target speed by the speed regulation coefficient.

The head speed estimator 109 estimates the speed of the magnetic head 2 (S105).

The subtractor 113 acquires the speed deviation amount that is the difference between the second target speed and the speed of the magnetic head 2 by calculation of subtracting the estimated value of the speed of the magnetic head 2 from the second target speed (S106).

The VCM controller 103 calculates the commanded value of the VCM current on the basis of the speed deviation amount (S107).

The VCM driver 104 generates the VCM current of the amount according to the commanded value of the VCM current, and supplies the generated VCM current to the VCM 4 (S108).

The VCM actual current detector 105 detects the amount of the VCM current supplied to the VCM 4, that is, the actual value of the VCM current (S109).

The VCM resistance estimator 106 estimates the resistance of the VCM 4 on the basis of the estimated value of the speed of the magnetic head 2 which value is acquired by the head speed estimator 109 and the actual value of the VCM current detected by the VCM actual current detector 105 (S110).

The power supply voltage detector 107 detects the power supply voltage (S111).

The seek voltage margin estimator 108 estimates the seek voltage margin on the basis of the power supply voltage value detected by the power supply voltage detector 107, the estimated value of the speed of the magnetic head 2 which value is acquired by the head speed estimator 109, and the estimated value of the resistance of the VCM 4 which value is acquired by the VCM resistance estimator 106 (S112).

The subtractor 114 acquires the VCM current deviation amount by calculation of subtracting the actual value of the VCM current from the commanded value of the VCM current (S113).

The seek error determiner 110 executes seek error determination, that is, determination whether the seek error is generated (S114).

The seek speed regulator 102 executes processing of updating the speed regulation coefficient (S115). Then, the operation of when the magnetic head 2 passes through the servo region 7 ends. When the magnetic head 2 passes through the servo region 7 next, the series of operations from S101 is executed again.

Figure 4:
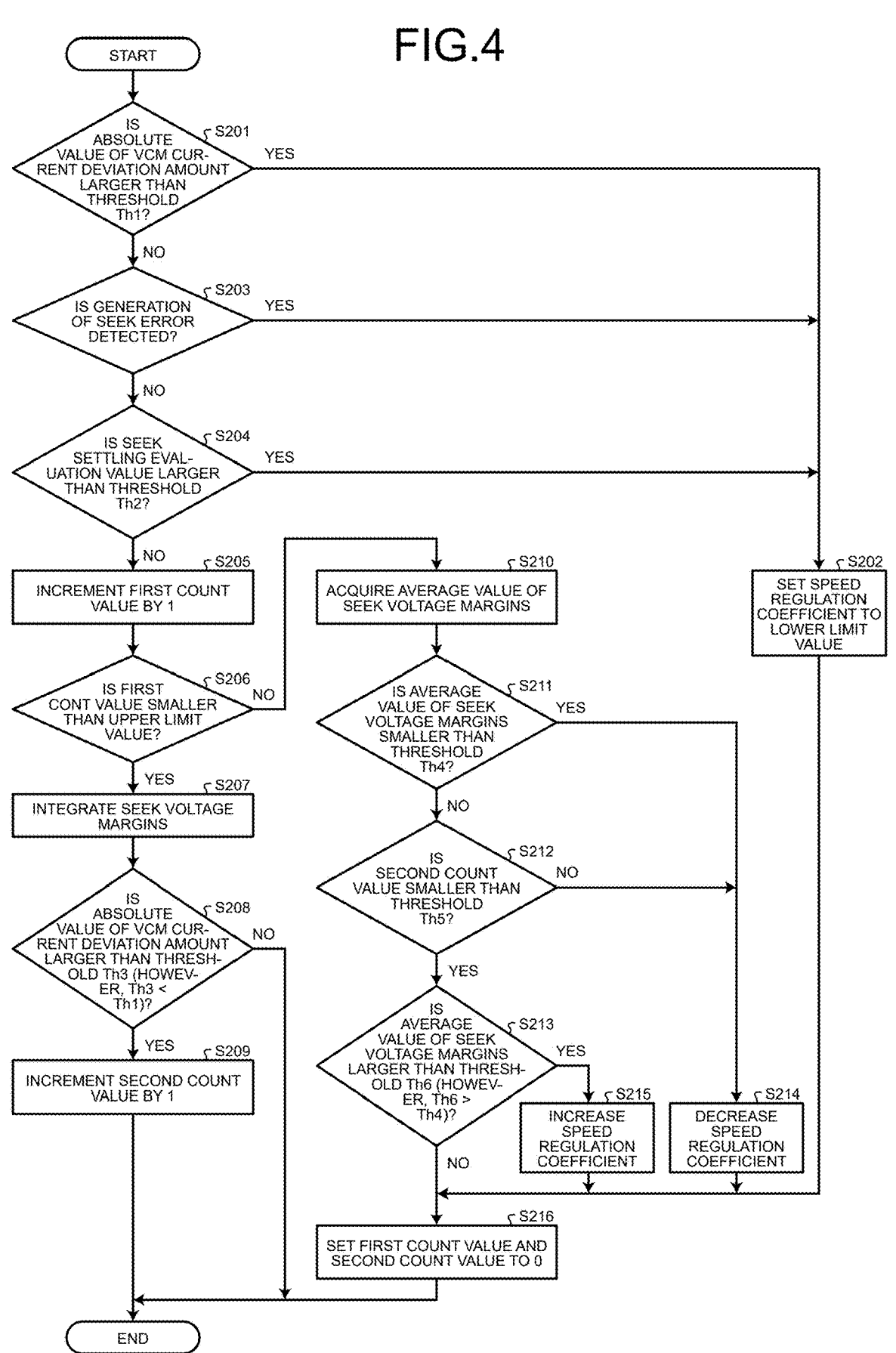
FIG. 4 is a flowchart illustrating an example of an operation of updating a speed regulation coefficient by a seek speed regulator according to the embodiment.

FIG. 4 is a flowchart illustrating an example of the operation of updating the speed regulation coefficient by the seek speed regulator 102 according to the embodiment.

First, the seek speed regulator 102 determines whether the absolute value of the VCM current deviation amount is larger than a threshold Th1 (S201). The threshold Th1 is a threshold of the VCM current deviation amount which threshold is used as a reference for determination whether the seek operation may fail. The threshold Th1 is determined at the time of manufacturing of the magnetic disk device 1000, or the like and stored in a storage region (such as the ROM 12).

In a case where the absolute value of the VCM current deviation amount is larger than the threshold Th1 (S201, Yes), the seek speed regulator 102 sets the speed regulation coefficient to a lower limit value (S202). A lower limit of a range in which the speed regulation coefficient can be changed is determined in advance. In a case where the absolute value of the VCM current deviation amount is larger than the threshold Th1, it can be estimated that the actual seek voltage margin is insufficient or there is a sign of insufficiency. The seek speed regulator 102 changes the speed regulation coefficient to the lower limit value and prevents the seek error from being generated continuously or the seek error from being generated.

In a case where the absolute value of the VCM current deviation amount is not larger than the threshold Th1 (S201, No), the seek speed regulator 102 determines whether generation of the seek error is detected (S203).

Note that the operations in and after S203 are executed every time the seek operation is completed once. The seek error determiner 110 determines whether the seek error is generated. The seek speed regulator 102 determines whether the seek error determiner 110 determines that the seek error is generated.

In a case where generation of the seek error is not detected (S203: No), the seek speed regulator 102 determines whether the seek settling evaluation value is larger than a threshold Th2 (S204).

When the seek operation is completed, the seek settling determiner 111 calculates a seek settling evaluation value. As described above, the seek settling evaluation value is the maximum value of the absolute value of the position error in the set period immediately after the seek settling operation is completed. In S204, the seek speed regulator 102 compares the seek settling evaluation value acquired by the calculation by the seek settling determiner 111 with the threshold Th2.

The threshold Th2 is a value that is used as a reference for determination whether a behavior of the position error of the seek settling operation is preferable by the subsequent positioning control. When the seek settling evaluation value exceeds the threshold Th2, it is indicated that the second target speed is too high and the behavior of the position error of the seek settling operation is deteriorated.

Note that the threshold Th2 is determined at the time of manufacturing of the magnetic disk device 1000, or the like and stored in the storage region (such as the ROM 12).

In a case where generation of the seek error is detected (S203: Yes) or in a case where the seek settling evaluation value is larger than the threshold Th2 (S204: Yes), the seek speed regulator 102 sets the speed regulation coefficient to the lower limit value (S202).

When generation of the seek error is not detected (S203: No) and in a case where the seek settling evaluation value is not larger than the threshold Th2 (S204: No), the seek speed regulator 102 increments a first count value representing the number of executions of the seek operation by 1 (S205). Then, the seek speed regulator 102 then determines whether the first count value is smaller than the upper limit value (S206).

The seek speed regulator 102 uses the average value of the seek voltage margins in the seek operation of the set number of times for the control of the amount of the VCM current. In S206, the seek speed regulator 102 confirms that the number of executions of the seek operation is smaller than the set number of times. That is, the set number of times is set as an upper limit value.

In a case where the first count value is smaller than the upper limit value (S206: Yes), the seek speed regulator 102 performs integration of the seek voltage margins (S207) . . . . . In a case where the number of the seek operations executed after the count with the first count value is started is M, the first count value is M. Then, at the start of the processing of S207, the seek speed regulator 102 stores a total value of the seek voltage margins in the M−1 seek operations executed already. In the processing of S207, the seek speed regulator 102 adds the latest estimated value of the seek voltage margin acquired by the seek voltage margin estimator 108 to the total value of the seek voltage margins in the M−1 seek operations. As a result, after the processing of S207, the total value of the seek voltage margins at the M seek operations is acquired.

Note that when the first count value reaches the upper limit value, the total value of the seek voltage margins is divided by the set number of times by the processing of S210 (described later), whereby the average value of the seek voltage margins in the seek operation for the set number of times is calculated.

After the processing of S207, the seek speed regulator 102 determines whether the absolute value of the VCM current deviation amount is larger than a threshold Th3 (S208).

The threshold Th3 is a threshold for detecting a sign that the seek operation fails. The threshold Th3 is smaller than the threshold Th1. More specifically, even when the absolute value of the VCM current deviation amount is smaller than the threshold Th1, when the number of times the absolute value of the VCM current deviation amount exceeds a certain level reaches a certain value (corresponding to a threshold Th5 (described later)), the seek speed regulator 102 determines that there is a sign of failure in the seek operation. Thus, the level is set as the threshold Th3. The threshold Th3 is determined at the time of manufacturing of the magnetic disk device 1000, or the like and stored in the storage region (such as the ROM 12).

In a case where the absolute value of the VCM current deviation amount is larger than the threshold Th3 (S208, Yes), the seek speed regulator 102 increments a second count value, which is a count value of the number of times the absolute value of the VCM current deviation amount exceeds the threshold Th3, by 1 (S209).

In a case where the absolute value of the VCM current deviation amount is not larger than the threshold Th3 (S208, No), or after the processing of S209, the operation of updating the speed regulation coefficient ends.

In a case where the first count value is not smaller than the upper limit value (S206: No), that is, in a case where the number of executions of the seek operation reaches the set number of times, the seek speed regulator 102 divides the total value of the seek voltage margins in the seek operation of the set number of times by the set number of times, and acquires the average value of the seek voltage margins (S210).

Regarding the seek voltage margin, the seek speed regulator 102 regulates the speed regulation coefficient in such a manner that the average value of the seek voltage margins is maintained at a predetermined low level. In the description of FIG. 4, the predetermined low level is defined as a range from a threshold Th4 to a threshold Th6. However, the threshold Th4 is smaller than the threshold Th6. The thresholds Th4 and Th6 are determined at the time of manufacturing of the magnetic disk device 1000, or the like and stored in the storage region (such as the ROM 12).

The seek speed regulator 102 determines whether the average value of the seek voltage margins is smaller than the threshold Th4 (S211). In a case where the average value of the seek voltage margins is smaller than the threshold Th4 (S211: Yes), it can be estimated that the second target speed is too high from a viewpoint of the seek voltage margin. Thus, the seek speed regulator 102 decreases the speed regulation coefficient (S214).

In a case where the average value of the seek voltage margins is not smaller than the threshold Th4 (S211: No), the seek speed regulator 102 determines whether the second count value, that is, the number of times the absolute value of the VCM current deviation amount exceeds the threshold Th3 is smaller than the threshold Th5 (S212).

In a case where the second count value is not smaller than the threshold Th5 (S212: No), that is, in a case where the second count value reaches the threshold Th5, it can be estimated that there is a sign that the seek operation fails. Thus, the seek speed regulator 102 decreases the speed regulation coefficient (S214).

In a case where the second count value is smaller than the threshold Th5 (S212: Yes), the seek speed regulator 102 determines whether the average value of the seek voltage margins is larger than the threshold Th6 (S213). In a case where the average value of the seek voltage margins is larger than the threshold Th6 (S213: Yes), it can be estimated that there is room for increasing the second target speed from the viewpoint of the seek voltage margin. Thus, the seek speed regulator 102 increases the speed regulation coefficient (S215).

Note that a method of decreasing the speed regulation coefficient in the processing of S214 and a method of increasing the speed regulation coefficient in the processing of S215 are not limited to specific methods. The seek speed regulator 102 may increase or decrease the speed regulation coefficient at a step width set previously.

In a case where the average value of the seek voltage margins is not larger than the threshold Th6 (S213: No), or after the processing of S202, after the processing of S214, or after the processing of S215, the seek speed regulator 102 sets the first count value and the second count value to 0 (S216). Then, the operation of updating the speed regulation coefficient ends.

Note that in the description of FIG. 4, in a case where the absolute value of the VCM current deviation amount is equal to the threshold Th1 in the processing of S201, the control transitions to S203. In a case where the absolute value of the VCM current deviation amount is equal to the threshold Th1, the control may transition to S202.

In the processing of S204, in a case where the seek settling evaluation value is equal to the threshold Th2, the control transitions to S205. In a case where the seek settling evaluation value is equal to the threshold Th2, the control may transition to S202.

In the processing of S208, in a case where the absolute value of the VCM current deviation amount is equal to the threshold Th3, the processing of S209 is skipped in the control. In a case where the absolute value of the VCM current deviation amount is equal to the threshold Th3 in the processing of S208, the control may transition to S209.

In a case where the average value of the seek voltage margins is equal to the threshold Th4 in the processing of S211, the control transitions to S212. In a case where the average value of the seek voltage margins is equal to the threshold Th4, the control may transition to S214.

In a case where the second count value is equal to the threshold Th5 in the processing of S212, the control transitions to S214. In a case where the second count value is equal to the threshold Th5, the control may transition to S213.

In a case where the average value of the seek voltage margins is equal to the threshold Th6 in the processing of S213, the control transitions to S216. In a case where the average value of the seek voltage margins is equal to the threshold Th6, the control may transition to S215.

Figure 5:
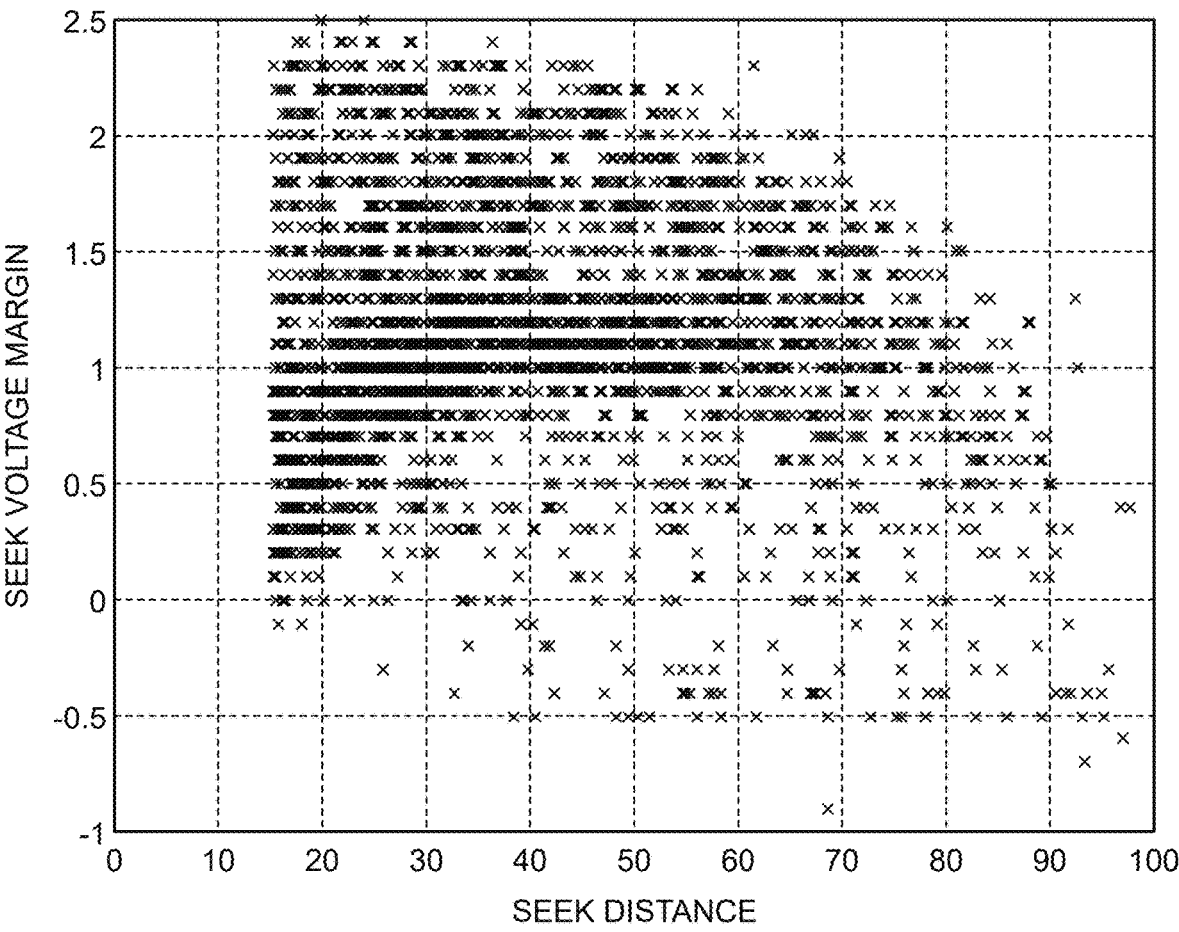
FIG. 5 is a graph illustrating an example of a distribution of instantaneous values of a seek voltage margin estimated by a seek voltage margin estimator according to the embodiment.

FIG. 5 is a graph illustrating an example of a distribution of instantaneous values of the seek voltage margin estimated by the seek voltage margin estimator 108 according to the embodiment. A horizontal axis represents the seek distance as a ratio to the maximum value (full stroke distance). A vertical axis represents the seek voltage margin acquired by estimation performed once by the seek voltage margin estimator 108, that is, the instantaneous value. It can be seen from the drawing that the instantaneous values of the seek voltage margin acquired by the estimation by the seek voltage margin estimator 108 vary significantly. In order to reduce an influence of the variation, in the embodiment, an average value of the instantaneous values of the seek voltage margins estimated in the seek operation of the set number of times is calculated as indicated by S210 in FIG. 4, and the average value is used to update the speed regulation coefficient.

Figure 6:
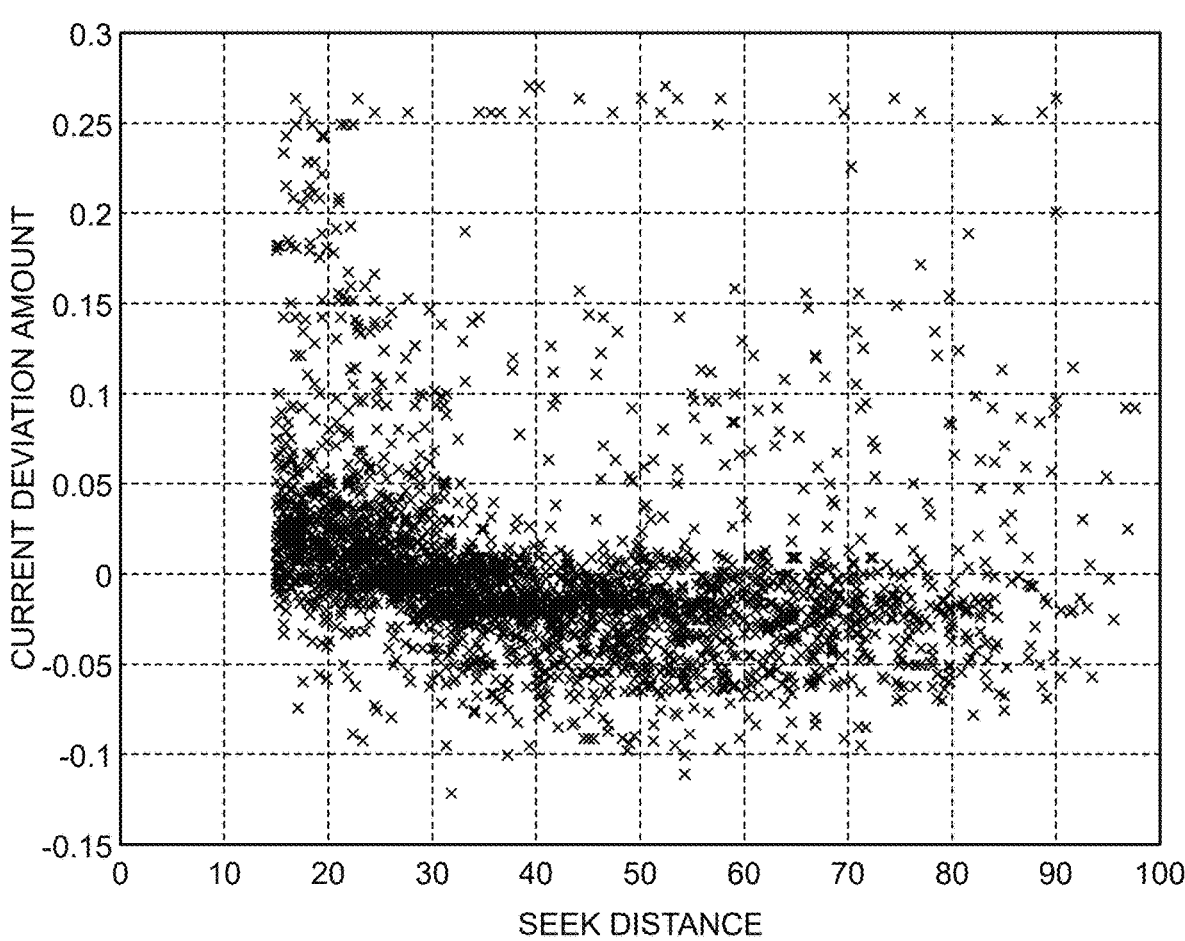
FIG. 6 is a graph illustrating an example of a distribution of VCM current deviation amounts according to the embodiment.

FIG. 6 is a graph illustrating an example of a distribution of the VCM current deviation amounts according to the embodiment. A horizontal axis represents the seek distance as a ratio to the maximum value (full stroke distance). It can be seen from this drawing that the variation in the VCM current deviation amounts is smaller than the variation in the estimated values of the seek voltage margin. Since the VCM current deviation amount is accurately obtained and has a small variation, the amount of the VCM current can be finely controlled in such a manner that a sign of insufficiency of the seek voltage margin or the insufficiency of the seek voltage margin is not generated by utilization of the VCM current deviation amount for the control of the speed regulation coefficient. As a result, the actual seek voltage margin can be maintained at a small level to the extent of not becoming insufficient, and the performance can be improved as compared with a case where only the average value of the seek voltage margins is used.

Figure 7:
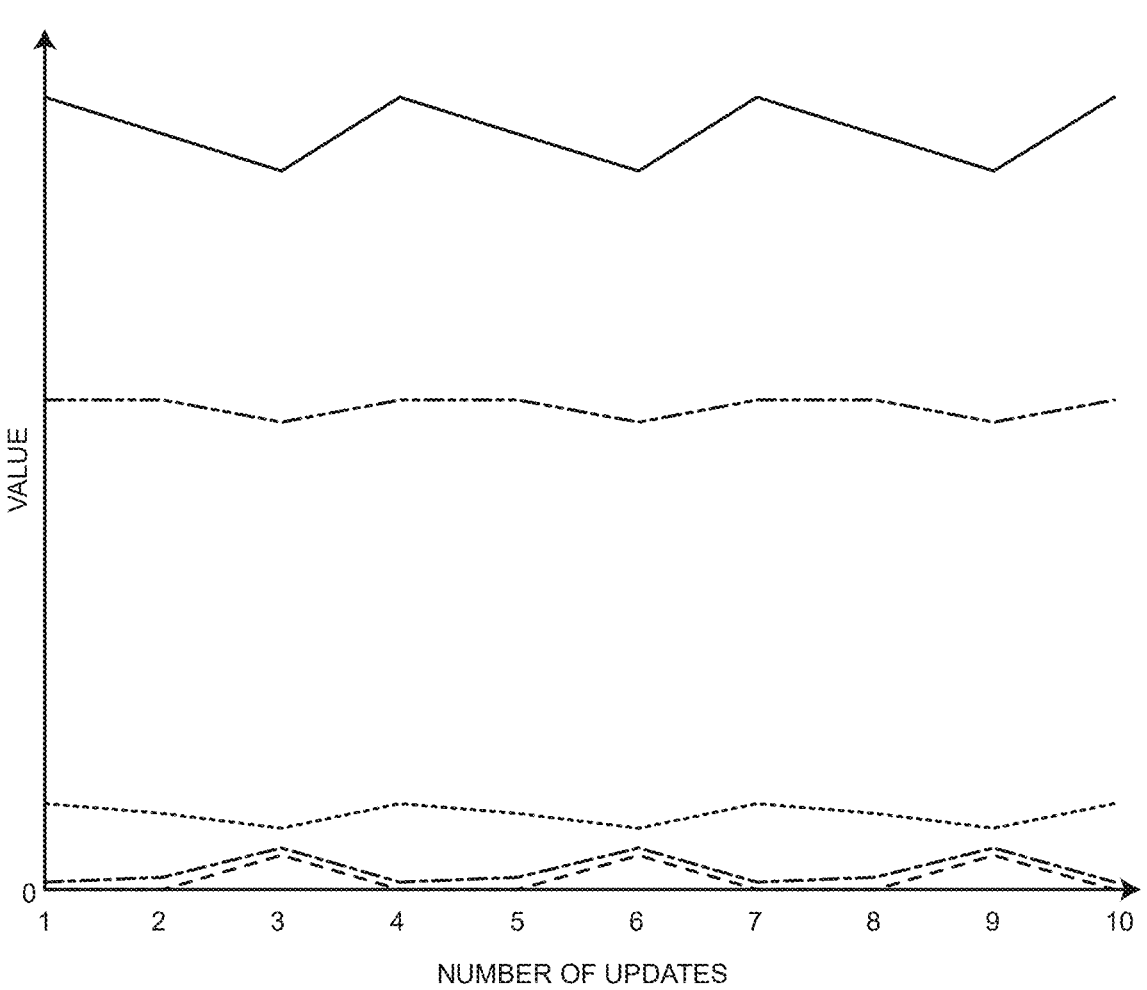
FIG. 7 is a view illustrating an example of a result of an operation of the magnetic disk device according to the embodiment.

FIG. 7 is a graph illustrating an example of a result of the operation of the magnetic disk device 1000 according to the embodiment. Temporal transitions of the speed regulation coefficient, the performance, the number of seek errors, the average value of the seek voltage margins, and the VCM current deviation amount are illustrated in the drawing. Note that a horizontal axis indicates the number of times the speed regulation coefficient is updated instead of time. As an example of an index indicating the performance, input/output operations per second (IOPS) are adopted here.

As illustrated in FIG. 7, the speed regulation coefficient is finely regulated, whereby the average value of the seek voltage margins is substantially constant. Then, the number of seek errors is controlled, and the performance is substantially constant.

As described above, according to the embodiment, in the seek operation, the controller 13 acquires the commanded value of the VCM current on the basis of the VCM current deviation amount.

More specifically, the controller 13 acquires the first target speed on the basis of the position deviation amount that is the difference between the position detection value and the target position. The controller 13 acquires the second target speed by calculation using the first target speed and the speed regulation coefficient that is an example of the parameter value. The controller 13 calculates the commanded value of the VCM current in such a manner that the speed of the magnetic head 2 approaches the second target speed. The controller 13 acquires the actual value of the VCM current that is the amount of the VCM current generated in accordance with the commanded value of the VCM current and supplied to the VCM drive circuit 14. Then, the controller 13 acquires the VCM current deviation amount by calculation of subtracting the actual value of the VCM current from the commanded value of the VCM current. Then, the controller 13 updates the speed regulation coefficient, which is an example of the parameter value, on the basis of the VCM current deviation amount.

Thus, the amount of the VCM current can be finely controlled in such a manner that a sign of insufficiency of the seek voltage margin or the insufficiency of the seek voltage margin is not caused. As a result, the actual seek voltage margin can be maintained at a small level to the extent of not becoming insufficient, and the performance can be improved as compared with a case where only the average value of the seek voltage margins is used.

Furthermore, according to the embodiment, the controller 13 acquires the second target speed by the calculation of multiplying the first target speed by the speed regulation coefficient.

Thus, the time required for the seek operation can be shortened in a state in which the actual seek voltage margin is maintained at a small level to the extent of not becoming insufficient.

Note that the method of acquiring the second target speed from the first target speed by using the parameter value is not limited to multiplying the first target speed by the speed regulation coefficient. The controller 13 (specifically, the seek speed regulator 102) may be configured to acquire the second target speed by adding (however, the addition includes addition of a negative value, that is, subtraction) a speed regulation value, which is another example of the parameter value, to the first target speed. In this case, the seek speed regulator 102 updates the speed regulation value on the basis of at least the VCM current deviation amount. The seek speed regulator 102 may update the speed regulation value on the basis of the estimated value of the seek voltage margin, the seek settling evaluation value, whether the seek error is generated, and the VCM current deviation amount. The speed regulation value may be updated by a method similar to the method of updating the speed regulation coefficient (such as the method illustrated in FIG. 4).

In addition, according to the embodiment, as illustrated in, for example, S201 and S202 in FIG. 4, the controller 13 changes the speed regulation coefficient (or the speed regulation value), which is the parameter value, to the lower limit value as the absolute value of the VCM current deviation amount exceeds the threshold Th1.

Since the absolute value of the VCM current deviation amount is larger than the threshold Th1, it can be estimated that the actual seek voltage margin is insufficient or there is a sign of insufficiency. By changing the speed regulation coefficient (or the speed regulation value) to the lower limit value in such a case, it is possible to prevent the seek error from being continuously generated or the seek error from being generated.

In addition, according to the embodiment, as illustrated in, for example, S208, S209, S212, and S214 in FIG. 4, the controller 13 counts the second count value that is the number of the seek operations in which the absolute value of the VCM current deviation amount exceeds the threshold Th3. Then, the controller 13 decreases the speed regulation coefficient (or the speed regulation value) as the second count value reaches the threshold Th5.

Since the second count value reaches the threshold Th5, it can be estimated that there is a sign that the seek operation fails. Thus, it is possible to prevent the seek operation from failing.

Furthermore, according to the embodiment, for example, as illustrated in S207, S210, S213, and S215 of FIG. 4, the controller 13 calculates the average value of the seek voltage margins in the seek operation of the set number of times every time the seek operation is executed the set number of times. As illustrated in the expression (1), the seek voltage margin is a voltage acquired by subtraction of the voltage drop amount in the VCM 4 from the power supply voltage. The controller 13 increases the speed regulation coefficient (or the speed regulation value) as the average value of the seek voltage margins exceeds the threshold Th6.

Thus, the time required for the seek operation can be shortened in a state in which the actual seek voltage margin is maintained at a small level to the extent of not becoming insufficient.

In addition, according to the embodiment, for example, as illustrated in S207, S210, S211, and S214 in FIG. 4, the controller 13 decreases the speed regulation coefficient (or the speed regulation value) as the average value of the seek voltage margins falls below the threshold Th4.

Thus, it is possible to maintain the actual seek voltage margin at a small level to the extent of not becoming insufficient.

In addition, according to the embodiment, as illustrated in, for example, S204 and S202 in FIG. 4, the controller 13 changes the speed regulation coefficient (or the speed regulation value) to the lower limit value as the seek settling evaluation value exceeds the threshold Th2.

Thus, it is possible to control an influence appearing in the position error after the seek settling operation due to a factor such as the second target speed being too high.

Note that when the position error of the magnetic head 2 increases during a write operation, there is a possibility that data to be written to the target track 5 is written at a position protruding to an adjacent track 5 of the target track 5 and the data of the adjacent track 5 is destroyed. That is, in the write operation, the position error of the magnetic head 2 is more severely controlled than in a read operation. Thus, the operation of calculating the second target speed or updating the parameter value by calculation using the first target speed and the parameter value may be executed in the seek operation for the read operation and may not be executed in the seek operation for the write operation. In such a case, it is possible to control the position error during the write operation from exceeding an allowable range due to a factor such as the target speed being too high.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic disk;
an arm provided with a magnetic head configured to access the magnetic disk;
a motor configured to move the arm to move the magnetic head in a radial direction of the magnetic disk;
a drive circuit configured to generate a motor current that drives the motor according to a commanded value of an amount of the motor current, and supply the generated motor current to the motor;
a current detection circuit configured to detect an amount of the motor current generated by the drive circuit; and
a controller configured to input, in a seek operation, a first value as the commanded value to the drive circuit, acquire a second value based on a deviation amount that is a difference between the first value and a first amount, the first amount being an amount of the motor current that is generated by the drive circuit according to the first value, and detected by the current detection circuit, and input the second value as the commanded value to the drive circuit after inputting the first value to the drive circuit.

2. The magnetic disk device according to claim 1, further comprising:
a position detection circuit configured to detect the position of the magnetic head in the radial direction, wherein
the controller is configured to:
acquire a first target speed of the magnetic head in the radial direction based on a difference between the position detected by the position detection circuit and the target position of the magnetic head in the radial direction;
acquire a second target speed of the magnetic head in the radial direction by calculation using the first target speed and a parameter value;
calculate a commanded value that is an amount of the first current in such a manner that a speed of the magnetic head in the radial direction approaches the second target speed; and
update the parameter value based on the deviation amount.

3. The magnetic disk device according to claim 2, wherein the controller is configured to acquire the second target speed by calculation of multiplying or adding the parameter value by or to the first target speed.

4. The magnetic disk device according to claim 3, wherein the controller is configured to change the parameter value to a lower limit value of the parameter value as an absolute value of the deviation amount exceeds a first threshold.

5. The magnetic disk device according to claim 3, wherein the controller is configured to count a first number and decreases the parameter value as the first number reaches a third threshold, the first number being a number of seek operations in which an absolute value of the deviation amount exceeds a second threshold.

6. The magnetic disk device according to claim 3, wherein the drive circuit is configured to generate the motor current by using power supplied from a power supply, and the controller is configured to calculate, every time the seek operation is executed by a set number of times, an average value of voltage margins in the set number of seek operations, each of the voltage margins being a value acquired by subtracting a voltage drop amount in the drive circuit from a voltage of the power, and increase the parameter value as the average value exceeds a fourth threshold.

7. The magnetic disk device according to claim 3, wherein the drive circuit is configured to generate the motor current by using power supplied from a power supply, and the controller is configured to calculate, every time the seek operation is executed by a set number of times, an average value of voltage margins in the set number of seek operations, each of the voltage margins being a value acquired by subtracting a voltage drop amount in the drive circuit from a voltage of the power, and decrease the parameter value as the average value is lower than a fifth threshold.

8. The magnetic disk device according to claim 3, wherein the controller is configured to change the parameter value to a lower limit value of the parameter value as an absolute value of the difference between the position detected by the position detection circuit and the target position of the magnetic head in the radial direction exceeds a sixth threshold in a set period immediately after the seek operation is completed.

9. The magnetic disk device according to claim 1, wherein the seek operation includes a seek operation for a read operation.

10. The magnetic disk device according to claim 2, wherein the seek operation includes a seek operation for a read operation.

11. The magnetic disk device according to claim 3, wherein the seek operation includes a seek operation for a read operation.

12. The magnetic disk device according to claim 4, wherein the seek operation includes a seek operation for a read operation.

13. The magnetic disk device according to claim 5, wherein the seek operation includes a seek operation for a read operation.

14. The magnetic disk device according to claim 6, wherein the seek operation includes a seek operation for a read operation.

15. The magnetic disk device according to claim 7, wherein the seek operation includes a seek operation for a read operation.

16. The magnetic disk device according to claim 8, wherein the seek operation includes a seek operation for a read operation.

\* \* \* \* \*